(12) United States Patent
Allals et al.

(10) Patent No.: US 8,112,135 B2
(45) Date of Patent: Feb. 7, 2012

(54) SUPERCONDUCTIVE ELECTRICAL CABLE

(75) Inventors: Arnaud Allals, Saint Julien (FR); Frank Schmidt, Langenhagen (DE)

(73) Assignee: Nexans, Paris (FR)

( * ) Notice: Subject to any disclaimer, the term of this patent is extended or adjusted under 35 U.S.C. 154(b) by 536 days.

(21) Appl. No.: 12/215,388

(22) Filed: Jun. 26, 2008

(65) Prior Publication Data

US 2009/0069188 A1    Mar. 12, 2009

(30) Foreign Application Priority Data

Jul. 17, 2007  (EP) .................................... 07290891

(51) Int. Cl.
*H01L 39/24* (2006.01)

(52) U.S. Cl. ........ 505/230; 505/163; 505/875; 505/894; 174/125.1

(58) Field of Classification Search .................. 505/163, 505/230, 875, 894; 174/125.1
See application file for complete search history.

(56) References Cited

U.S. PATENT DOCUMENTS

| | | | | |
|---|---|---|---|---|
| 3,428,925 A | * | 2/1969 | Bogner et al. | 335/216 |
| 6,038,462 A | * | 3/2000 | Snitchler et al. | 505/231 |
| 2003/0164246 A1 | * | 9/2003 | Nassi et al. | 174/125.1 |
| 2004/0171308 A1 | * | 9/2004 | Hirose | 439/668 |
| 2006/0254804 A1 | * | 11/2006 | Ashibe et al. | 174/125.1 |

FOREIGN PATENT DOCUMENTS

| | | |
|---|---|---|
| DE | 19719738 | 11/1997 |
| EP | 0830694 | 3/1998 |

* cited by examiner

*Primary Examiner* — Jessica L Ward
*Assistant Examiner* — Paul Wartalowicz
(74) *Attorney, Agent, or Firm* — Sofer & Haroun, LLP

(57) ABSTRACT

A superconductive electrical cable is provided, which comprises a conductor consisting of superconductive wires. The conductor (L) is designed as a stranded conductor in which the wires (1) are stranded together with a predetermined pitch length (S) lying between about 5×D and about 20×D, where D is the diameter of the stranded conductor.

5 Claims, 1 Drawing Sheet

SUPERCONDUCTIVE ELECTRICAL CABLE

RELATED APPLICATION

This application relates to and claims the benefit of priority from European Patent Application No. 07290891.6, filed on Jul. 17, 2007, the entirety of which is incorporated by reference.

FIELD OF THE INVENTION

The invention relates to a superconductive electrical cable, which comprises a conductor consisting of superconductive wires (DE 197 19 738 B4).

BACKGROUND

A superconductive cable has at least one electrical conductor made of a special material, which enters the superconductive state at a sufficiently low temperatures. The electrical resistance of a correspondingly constructed conductor thereby tends towards zero. Suitable materials are for example YBCO (yttrium-barium-copper oxide) or BiSCCO (bismuth-strontium-calcium-copper oxide). Sufficiently low temperatures for such material to achieve the superconductive state lie, for example, between 4 K and 110 K. Suitable refrigerants are for example nitrogen, helium, neon and hydrogen or mixtures of these substances, respectively in the gaseous or liquid state. Cold-dielectric and warm-dielectric superconductive cables are known.

In a cold-dielectric superconductive cable, the conductor is enclosed by a dielectric consisting of layers of insulating material, in which a liquid refrigerant is present as an impregnating medium in the dielectric. Such a cable is distinguished in that very high powers can be transmitted in the high-voltage range. It consists for example of the conductor as an inner conductor and a screen or return conductor arranged concentrically therewith, which are separated and kept apart by a dielectric (insulation). The individual superconductive elements of such a cable consist, for example, of strips comprising superconductive material such as YBCO or BiSCCO, which are wound close together with a long pitch around a support in mutually insulated concentric layers (EP 0 830 694 B1). A corresponding cable is enclosed by a cryostat, which carries the refrigerant and consists of two concentric metal tubes insulated from one another by vacuum insulation.

Warm-dielectric superconductive cables have a conductor which is arranged directly in such a cryostat carrying the refrigerant. The dielectric and the screen or return conductor are fitted over the cryostat. In such a cable as well, the conductor consists of mutually insulated concentric layers of strips comprising superconductive material lying close together.

This structure of the conductor also applies to the known superconductive AC cable according to DE 197 19 738 B4, which was mentioned in the introduction. The conductor of this cable consists of circular wires made of oxidic superconductive materials. The wires are arranged in a plurality of concentric layers around a tube. The layers are mutually insulated. The insulating interlayers between the individual layers of the wires are intended to improve the current distribution in the conductor. However, they entail additional outlay on material and for production of the conductor. Furthermore, the conductor therefore has a relatively large diameter which also leads overall to larger dimensions of the cable.

OBJECTS AND SUMMARY

It is an object of the invention to configure the superconductive cable presented in the introduction so that it can be produced more easily with a simplified structure having smaller dimensions.

This object is achieved according to the invention in that the conductor is designed as a stranded conductor in which the wires are stranded together with a predetermined pitch length lying between about 5×D and about 20×D, where D is the diameter of the stranded conductor.

The conductor of this cable may be produced by a usual technique for high-voltage cables or heavy-current cables with conventional machines. The conductor does not require a central core element or any insulating layers. Such a conductor is geometrically very simply constructed and it has a correspondingly small diameter. By complying with particular pitch lengths of the stranding in the specified range, the conductor furthermore ensures a good current distribution with correspondingly low AC losses and favourable utilization of the superconductive material, even without the use of insulating interlayers. The conductor may be used for cold- or warm-dielectric superconductive cables with the structures known per se lying over the conductor. A screen or return conductor may likewise be constructed with wires such as are used for the conductor. Here again, conventional machines and manufacturing techniques may then be used.

BRIEF DESCRIPTION OF THE DRAWINGS

Exemplary embodiments of the subject-matter of the invention are represented in the drawings.

DETAILED DESCRIPTION

Figure 1:
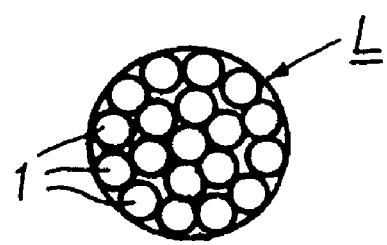
FIGS. 1 and 2 show cross sections of a conductor usable in a cable according to the invention, in two different embodiments.
Figure 3:
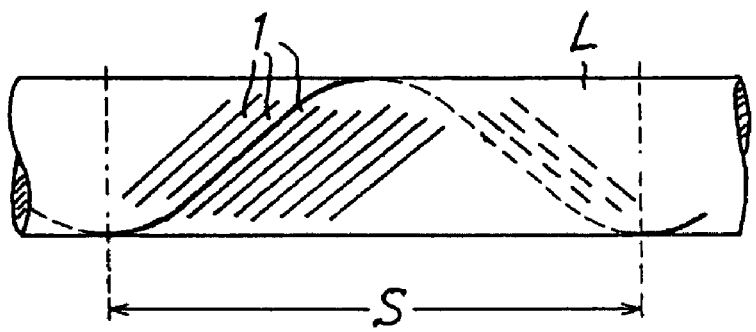
FIG. 3 shows a side view of the conductor according to FIG. 1 in a highly schematic representation.

FIG. 1 represents a cross section of an electrical conductor L designed as a stranded conductor, which consists of a multiplicity of superconductive wires 1 stranded together. The wires 1 may have a circular cross section corresponding to the graphical representation, but also a polygonal cross section. They are stranded together according to FIG. 3 with a predetermined pitch length S, which lies between two limit values related to the diameter D of the conductor L. These limit values are defined by about 5×D as the lower limit value and about 20×D as the upper limit value. Such a conductor L—as already mentioned—may be produced with usual machines and manufacturing techniques in cable technology.

Additionally, the wires 1 may also be coated with a very thin lacquer layer lying in the μm range. With a conductor L constructed from such wires, the current distribution can be improved further and the AC losses can be further reduced.

Figure 2:
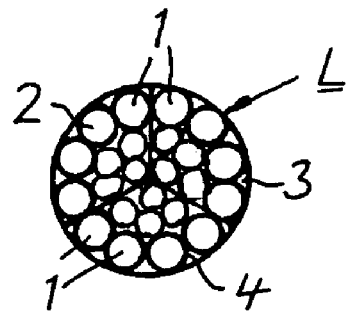

The conductor L may according to FIG. 2 also be constructed from for example three sectors 2, 3 and 4 in which the superconductive wires 1 are respectively stranded together with the specified pitch length S.

The sectors 2, 3 and 4 are expediently separated from one another by thin insulating layers, which consist for example of carbon paper. They are likewise stranded together. Such a structure of the conductor L also leads to a further improvement of the current distribution and a further reduction of the AC losses. The conductor L may also be constructed from more than three sectors. It may also consist of only two sectors.

The wires 1 advantageously comprise YBCO as their superconductive material. A corresponding wire has for example an elongate metal support with a circular or polygonal cross section, around which a layer of a textured metal substrate is wrapped as a base for an YBCO layer. A wire 1 comprising an YBCO layer is produced for example as follows:

A metal substrate provided as a strip, and already textured by pretreatment, is wrapped longitudinally around the support so as to form a slotted tube. The strip or substrate consists for example of nickel, copper or iron or an alloy. For example, a biaxial texture has been imparted to it in a pretreatment step. The edges of this slotted tube, which extend in the longitudinal direction, are then welded in a welding device so as to form a tube closed by a weld bead. The closed tube then has its dimensions reduced in a pulling device until it bears on the support. The element produced in this way is subsequently provided all around with a layer of YBCO material. A layer of ceramic material, for example lanthanum zirconate, may optionally also be applied onto the tube beforehand, specifically before or after it is contracted by pulling. Corresponding coating methods are known. The wire 1 coated with superconductive YBCO material is lastly subjected to a heat treatment in order to achieve the superconductivity. For this, it is preferably annealed at temperatures of from 700° C. to 850° C.

Figure 4:
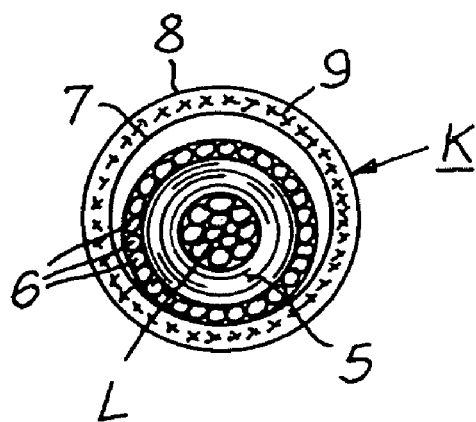
FIGS. 4 and 5 show cross sections of two differently constructed cables with a conductor according to FIG. 1.

A cable having a conductor L according to FIG. 1 or FIG. 2 may be configured for example as a single-phase cold-dielectric superconductive cable according to FIG. 4. Over the conductor L, there is a dielectric 5 consisting for example of a plurality of layers of paper or another suitable insulator. The conductor L and dielectric 5 together form a core of the cable. This core is enclosed by a screen or return conductor 6. This consists of at least one layer of wires with good electrical conductivity, which may also be superconductive and constructed like the wires 1. The cable equipped in this way is enclosed by a cryostat K which consists of two concentric metal tubes 7 and 8, which are separated from one another by an annular space 9 in which there is vacuum insulation. A refrigerant is fed through the cryostat K in order to cool the superconductive cable, and it also penetrates into the dielectric 5 as an impregnating medium. Three cores consisting of a conductor L and a dielectric 5 may also be arranged in the cryostat K, which constitute the three phases of a superconductive cable for a triple-phase system.

Figure 5:
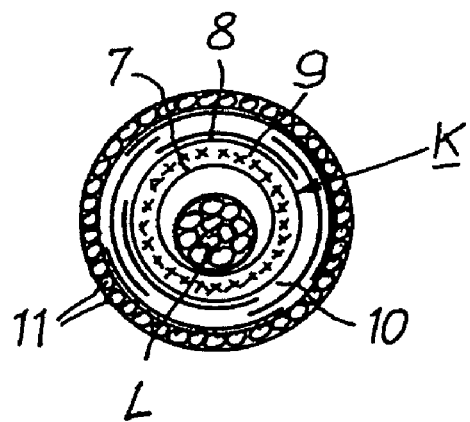

According to FIG. 5 the conductor L may also be arranged directly in a cryostat K, for the structure of which the same applies as for the cryostat K according to FIG. 4. Lying over the cryostat K in this embodiment of the cable, there are a dielectric 10 and a screen or return conductor 11. The structure of the latter may correspond to that of the screen or return conductor 6 according to FIG. 4.

The invention claimed is:

1. Superconductive electrical cable comprising:
   a conductor having superconductive wires enclosed by a cryostat for guiding a cooling medium that is made of two concentric metal tubes which are separated from one another by an annular space in which vacuum insulation is provided, wherein the conductor is a stranded conductor in which a plurality of wires are in physical contact with each other and are stranded together with predetermined pitch length having a value between about 5×D and about 20×D, where D is the diameter of the stranded conductor, and wherein the conductor is subdivided into sectors by thin insulating layers.

2. Cable according to claim 1, wherein the conductor is enclosed by a dielectric, over which a screen or return conductor including superconductive wires is applied.

3. Cable according to claim 1, wherein the wires have a circular cross section.

4. Cable according to claim 1, wherein the wires have a polygonal cross section.

5. Cable according to claim 1, wherein the wires are coated with a thin lacquer layer.

* * * * *